(12) United States Patent
Adelerhof et al.

(10) Patent No.: US 6,577,121 B1
(45) Date of Patent: Jun. 10, 2003

(54) MAGNETORESISTIVE SENSOR FOR MEASURING RELATIVE DISPLACEMENT OF CONSTRUCTION PARTS

(75) Inventors: Derk J. Adelerhof, Eindhoven (NL); Kars-Michiel H. Lenssen, Eindhoven (NL)

(73) Assignee: Koninklijke Philips Electronics N.V., Eindhoven (DE)

( * ) Notice: Subject to any disclaimer, the term of this patent is extended or adjusted under 35 U.S.C. 154(b) by 0 days.

(21) Appl. No.: 09/600,048

(22) PCT Filed: Nov. 10, 1999

(86) PCT No.: PCT/EP99/08636

§ 371 (c)(1),
(2), (4) Date: Jul. 11, 2000

(87) PCT Pub. No.: WO00/28282

PCT Pub. Date: May 18, 2000

(30) Foreign Application Priority Data

Nov. 11, 1998 (EP) .............................................. 98203803

(51) Int. Cl.[7] .............................. G01B 7/30; G01D 5/16; G01R 33/06
(52) U.S. Cl. ............................. 324/207.21; 324/207.24; 324/207.25
(58) Field of Search ................... 324/207.21, 207.25, 324/207.24, 235, 252; 338/32 R; 341/15

(56) References Cited

U.S. PATENT DOCUMENTS

| | | | |
|---|---|---|---|
| 4,578,624 A | * | 3/1986 | Neki et al. ................. 338/32 R |
| 5,570,015 A | * | 10/1996 | Takaishi et al. ....... 324/207.21 |
| 5,796,249 A | * | 8/1998 | Andraet et al. ........ 324/207.21 |

OTHER PUBLICATIONS

Philips Semiconductors Data Handbook, SC 17, Product Specification, Dec. 6, 1997, pp. 183–187.

\* cited by examiner

Primary Examiner—Walter E. Snow
(74) Attorney, Agent, or Firm—Steven R. Biren

(57) ABSTRACT

Magnetoresistive sensor (1) for measuring relative displacements of construction parts (2, 3). A magnetoresistive element (4) is formed on a surface (7) of a substrate (8). A magnet system (5) generates a magnetic field (13) having a component (14) directed parallel to the substrate surface at the area of the magnetoresistive element. Upon the relative displacement of the construction parts, this field component extends at different angles α to the magnetoresistive element and is so large that the magnetoresistive element is always magnetically saturated during the displacement. Upon a relative displacement of the construction parts, the magnetoresistive element describes a path (20, 21) with respect to the magnet system. The sensor is suitable for measuring rotations through angles up to 360° and for measuring large translations.

22 Claims, 3 Drawing Sheets

MAGNETORESISTIVE SENSOR FOR MEASURING RELATIVE DISPLACEMENT OF CONSTRUCTION PARTS

BACKGROUND OF THE INVENTION

This invention relates to a magnetoresistive sensor for measuring relative displacements of construction parts, comprising a magnetoresistive element formed on a surface of a substrate, and a magnet system which generates a magnetic field having a component directed parallel to the substrate surface at the area of the magnetoresistive element. The field component, upon the relative displacement of the construction parts, extends at different angles α to the magnetoresistive element and is so large that the magnetoresistive element is always magnetically saturated during the displacement.

A magnetoresistive sensor of this type may be used for determining the mutual position of two construction parts in a contactless way, with the magnetoresistive element being secured to one of the construction parts and the magnet system being secured to the other part. The construction parts may be, for example, a housing and a cam shaft rotatable therein, as is customary in motorcar engines. The construction parts may also be, for example, a rail system and a slide which is movable across this system, as is customary in movable car seats. In the first-mentioned case, the displacement is a rotation, in the last-mentioned case, it is a translation.

During the displacement of the construction parts, the magnetoresistive element is always magnetically saturated by the magnetic field component directed parallel to the surface of the substrate of the magnetoresistive element. The magnetoresistive element then has a resistance which only depends on the angle α at which the element extends to the component of the magnetic field. Moreover; variations of the magnetic field strength which may be caused, for example, by temperature fluctuations substantially do not influence the operation of the sensor and mechanical tolerances may be relatively large, both in the manufacture and during use of the sensor.

A magnetoresistive sensor of the type described in the opening paragraph is known from Philips Semiconductors Data Handbook SC 17, Product Specification, Dec. 6, 1997, pp. 183–187, particularly FIGS. 2 and 3, which sensor is used for determining the rotation of a shaft. The magnet system is a permanent magnet which is secured to the end of the shaft, and the magnetoresistive element is arranged at some distance from the end of the shaft. The magnetic field extends at an angle α to the magnetoresistive element. The centerline of the shaft perpendicularly intersects the surface on which the magnetoresistive element is formed. The magnetoresistive element has a resistance which is dependent on sin2α. Therefore, only rotations up to 90° can be unambiguously measured with the sensor.

SUMMARY OF THE INVENTION

It is, inter alia, an object of the invention to provide a magnetoresistive sensor allowing measurements of displacements in which the extent of the displacement is less limited than in the known magnetoresistive sensor.

According to the invention, the magnetoresistive sensor is therefore characterized in that, upon relative displacement of the construction parts, the magnetoresistive element describes a path with respect to the magnet system.

In the known sensor described above, the centerline of the shaft on which the magnet is secured perpendicularly intersects the surface on which the magnetoresistive element is formed. Upon rotation of the shaft, the magnetic field rotates around this point of intersection. With respect to the magnet system, the magnetoresistive element rotates about the same point of intersection and does not change its position. In the sensor according to the invention, the magnetoresistive element does not maintain its position with respect to the magnet system but describes a path with respect to the magnet system. In practice, the magnetoresistive element will generally be stationary, whereas the magnet system changes position, but for a better understanding of the invention it will be clearer if the relative displacement is described as a displacement of the magnetoresistive element with respect to the magnet system. Since the magnetoresistive element describes a path with respect to the magnet system, the magnet system may be designed in such a way that a desired magnetic field is generated at each point of the path. Large translations and large rotations up to substantially 360° can be unambiguously measured with such a sensor.

Upon the relative displacement of the construction parts, said component of the magnetic field preferably extends at angles α to the magnetoresistive element, which angles are within a work range in which the magnetoresistive element has a resistance depending substantially linearly on these angles. The magnet system can then be designed in such a way that large translations and large rotations up to substantially 360° can be measured in a linear manner.

In a magnetoresistive sensor for determining a mutual rotation of the construction parts, the magnetoresistive element preferably describes a circular path with respect to the magnet system, with a center with respect to which the magnetoresistive element occupies a fixed position. One of the construction parts is arranged, for example, fixedly, whereas the other construction part can rotate with respect to the fixed construction part. Either the magnetoresistive element or the magnet system is then secured to the rotating construction part. When the magnetoresistive element or the magnet system is directly secured to the rotating construction part, for example, by means of a fixed arm, then it automatically describes a circular path with respect to the fixed construction part. Gears with, for example, cogs are not necessary for realizing the circular path. Rotations up to substantially 360° can be measured.

In a first embodiment of the magnetoresistive sensor, the magnet system generates a magnetic field, with field lines which radially extend in the plane of the path with respect to an axis of symmetry directed transversely to the plane of the path and intersecting the plane of the path next to the center of the path. The magnetic field component directed parallel to the surface of the substrate extends along the circular path at different angles ox to the magnetoresistive element. The distance between the center of the path and the point of intersection of the symmetry axis with the plane of the path determines the work range within which the angle α varies during the rotation of the construction parts. This distance may simply be chosen to be such that this angle α remains in said work range during the rotation.

If the construction parts rotate at an angle β with respect to each other, then the resistance of the magnetoresistive element changes linearly with the angle α but not with the angle β in such a magnetic field. The angle α is not linearly dependent on the angle β. For the described magnetic field, in which the magnetoresistive element describes a circular path, the resistance does not appear to extend directly proportional to the angle β but substantially to the sine of the angle β. A rotation of 180° can thus be unambiguously measured with the sensor.

A magnet system with which such a field is realized in a simple manner comprises two concentrically arranged ring magnets with their polar faces located in a plane extending parallel to the plane of the path, and with a common centerline constituting the axis of symmetry of the magnet system, both ring magnets being magnetized in opposite sense transversely to the plane of the path. Such a magnet system with two ring magnets may be mounted around a shaft, with the centerline of the shaft then passing through the center of the path of the magnetoresistive element.

To ensure that, in this first embodiment, the magnetoresistive element is always saturated during the mutual rotation of the construction parts, a magnetic field which is as small as possible is sufficient if the surface of the substrate on which the magnetoresistive element is formed is located in the plane of the path of the magnetoresistive element.

In a second embodiment of the magnetoresistive sensor, the magnet system generates a magnetic field with substantially parallel field lines which intersect the plane of the path at an angle at the location of the circular path. The magnetic field component directed parallel to the substrate then extends along the circular path at different angles to the magnetoresistive element. The size of the angle at which the field lines extend to the plane of the path determines the work range within which the angle $\alpha$ varies during the rotation of the construction parts. This angle can be chosen to be such that the angle $\alpha$ remains in said work range during the rotation.

Also in this case, it holds that the resistance of the magnetoresistive element substantially changes with the sine of the angle $\beta$ if the construction parts rotate at an angle $\beta$ with respect to each other, so that a rotation of 180° can be unambiguously measured also with this sensor.

A magnet system in which such a field is realized in a simple manner comprises two ring magnets which, with their polar faces facing each other, are arranged on both sides and at an equal distance from the plane of the path, with centerlines intersecting the plane of the path at points located at equal distances on both sides of the center of the path, both ring magnets being magnetized in equal sense transversely to the plane of the path. Also this magnet system, again with two ring magnets, may be mounted around a shaft, in which the centerline of the shaft then passes through the center of the path of the magnetoresistive element.

To ensure that, in this second embodiment, the magnetoresistive element is always magnetized during the mutual rotation of the construction parts, a magnetic field which is as small as possible is sufficient if the substrate surface on which the magnetoresistive element is formed extends transversely to the path of the magnetoresistive element.

Rotations up to 180° can be measured in an unambiguous manner with the sensors of the first and the second embodiment. The field of application is extended if the sensor comprises two magnetoresistive elements which describe the same circular path with respect to the magnet system, occupy the same fixed position with respect to the center of the path and, viewed from the center, enclose an angle of 90°. The resistance of one magnetoresistive element then changes upon a mutual rotation of the construction parts by $\sin \beta$, while the resistance of the second magnetoresistive element, which is rotated 90° with respect to the first element, changes by $\cos \beta$. The angle $\beta$ can then be calculated from these two resistances over an interval of 360°. By adding a suitable electronic circuit, the rotation through 360° can even be measured linearly.

In a magnetoresistive sensor for determining a mutual translation of the construction parts, the magnetoresistive element preferably describes a rectilinear path with respect to the magnet system, which path is located in a reference plane with respect to which the magnetoresistive element occupies a fixed position. Either the magnetoresistive element or the magnet system is then secured to the moving construction part and then moves along a rectilinear path. Gears with, for example, cogs are then not necessary for realizing the desired rectilinear path. The translation may be large.

In a third embodiment of the magnetoresistive sensor, the magnet system generates a magnetic field with field lines intersecting the reference plane at different angles at the location of the rectilinear path. It is thereby realized that the component of the magnetic field directed to the surface of the substrate extends along the path at different angles $\alpha$ to the magnetoresistive element. The angles at which the field lines intersect the reference plane may be simply chosen to be such that the angle $\alpha$ remains in said work range during the translation.

A magnet system with which such a magnetic field can easily be realized comprises two elongated magnets which, with their polar faces facing each other, are arranged on both sides of the reference plane and, viewed in projection on the reference plane, intersect each other in the center of the path and enclose an equally large, but opposite angle to the rectilinear path, both magnets being magnetized in the same direction transverse to the reference plane. The two opposite angles may be chosen to be such that the angle $\alpha$ remains in the desired work range.

To ensure that, in this third embodiment, the magnetoresistive element is always magnetized during the mutual translation of the construction parts, a magnetic field which is as small as possible is sufficient if the substrate surface on which the magnetoresistive element is formed extends transversely to the path of the magnetoresistive element.

These and other aspects of the invention are apparent from and will be elucidated with reference to the embodiments described hereinafter.

DESCRIPTION OF THE PREFERRED EMBODIMENTS

Figure 1:
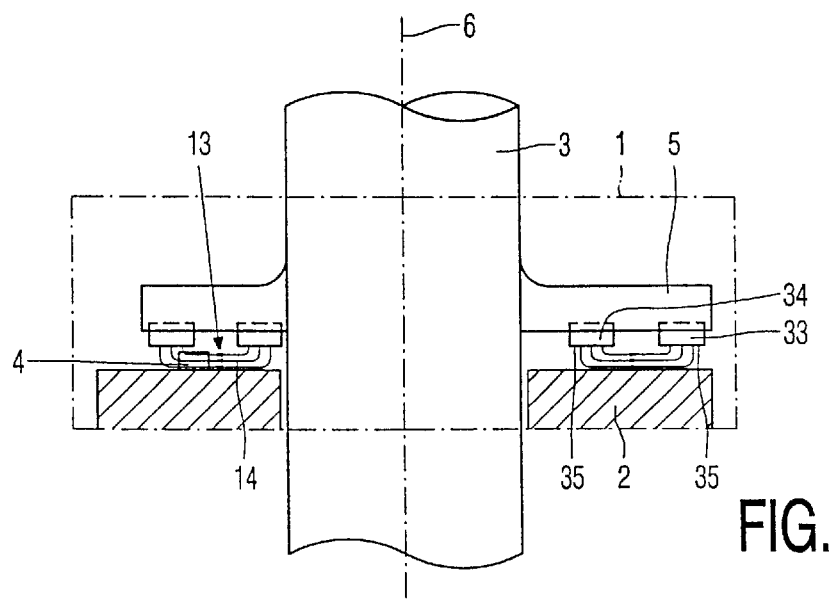
FIG. 1 shows diagrammatically a first embodiment of the magnetoresistive sensor according to the invention.
Figure 2:
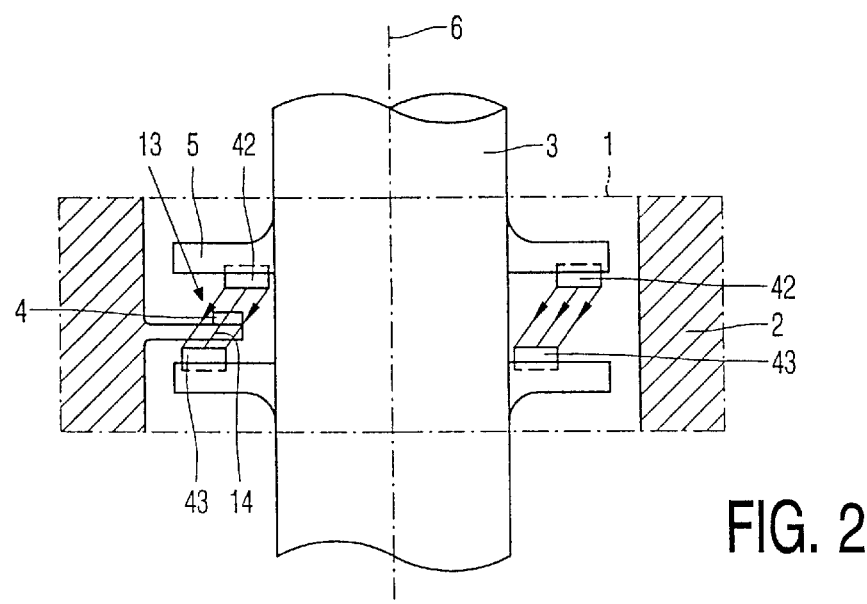
FIG. 2 shows diagrammatically a second embodiment of the magnetoresistive sensor according to the invention.

FIGS. 1 and 2 show diagrammatically a first and a second embodiment of a magnetoresistive sensor 1 for measuring relative displacements of construction parts 2 and 3, with a magnetoresistive element 4 connected to a first construction part 2 and a magnet system 5 connected to a second construction part 3. The construction parts 2 and 3 shown in FIGS. 1 and 2 may rotate with respect to each other about the shaft 6. The construction part 2 is stationary, the shaft 3 is rotatable.

Figure 3:
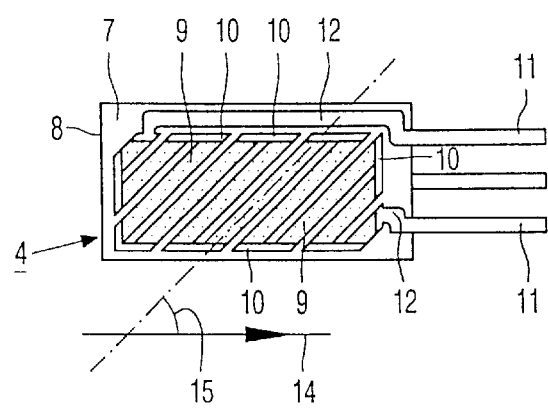
FIG. 3 shows diagrammatically a magnetoresistive element used in the magnetoresistive sensor.

FIG. 3 shows diagrammatically the magnetoresistive element 4 which is used in the sensor 1 shown in FIGS. 1 and 2. The magnetoresistive element 4 is formed on a surface 7 of a substrate 8. In this embodiment, the magnetoresistive element 4 is formed by a large number of parallel permalloy strips 9 which are arranged in series by means of conducting strips 10. For external contacts, connection pins 11 are provided which are connected to the strips 9 by means of electric conductors 12.

A magnetic field 13 with a component 14 directed parallel to the surface 7 of the substrate 8, one of which components is shown in FIG. 3, is generated with the magnet system 5 at the location of the magnetoresistive element 4. Upon the relative displacement of the construction parts 2 and 3, this component 14 extends at different angles α, denoted by the reference numeral 15, to the magnetoresistive element and is so large that the magnetoresistive element is always magnetically saturated during the displacement. The resistance of the magnetoresistive element shown is then dependent on sin 2α.

Figure 4:
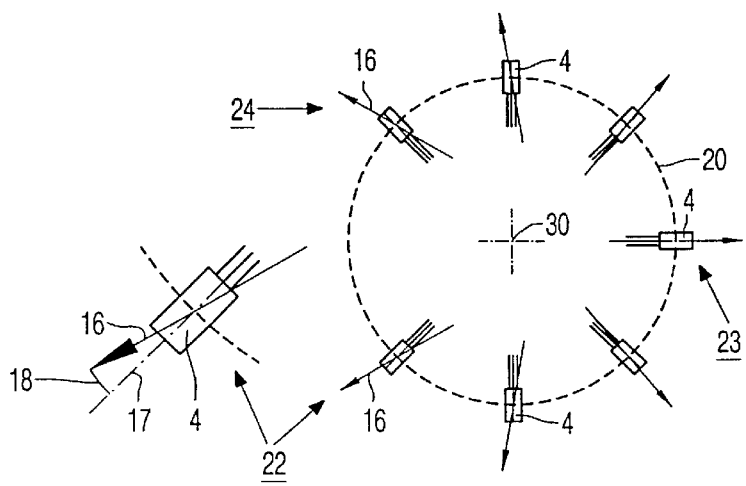
FIG. 4 shows diagrammatically the path described by the magnetoresistive element with respect to the magnet system upon a mutual rotation of the construction parts.
Figure 7:
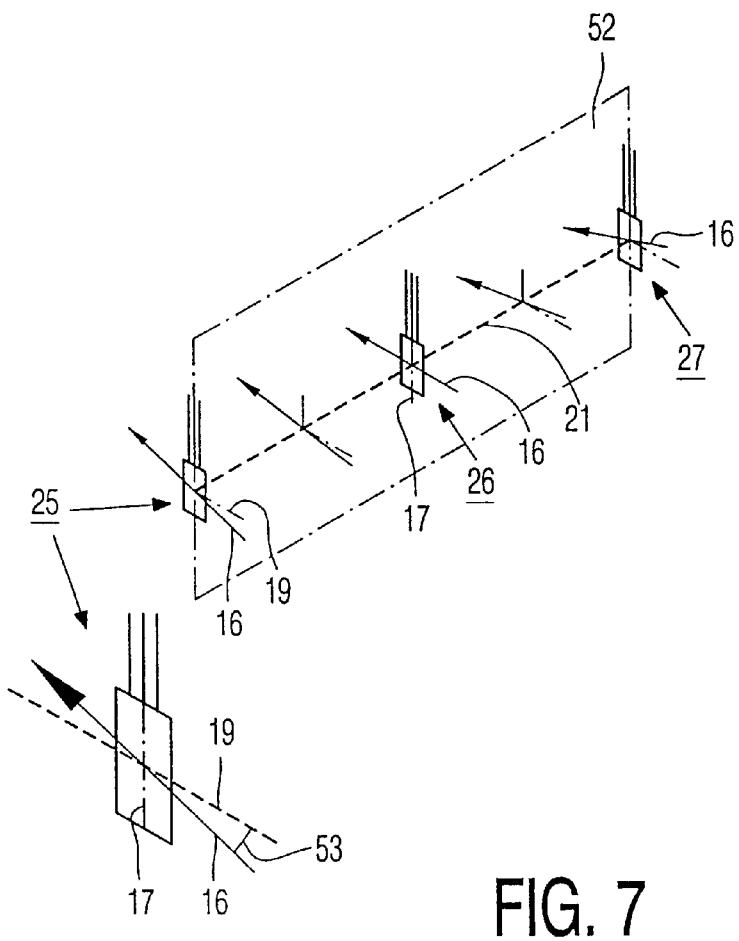
FIG. 7 shows diagrammatically the path described by the magnetoresistive element with respect to the magnet system upon a mutual translation of the construction parts.

As is shown in FIGS. 4 and 7, the magnetoresistive element 4 according to the invention describes a path 20, 21 with respect to the magnet system 5 upon a relative displacement of the construction parts 2 and 3, respectively. The magnetic field 13 which is generated by the magnet system 5 has field lines 16 which extend at different angles 18 to the longitudinal axis 17 of the magnetoresistive element 4. In this case, the angle α is 45° reduced by the angle 18.

Figure 5:
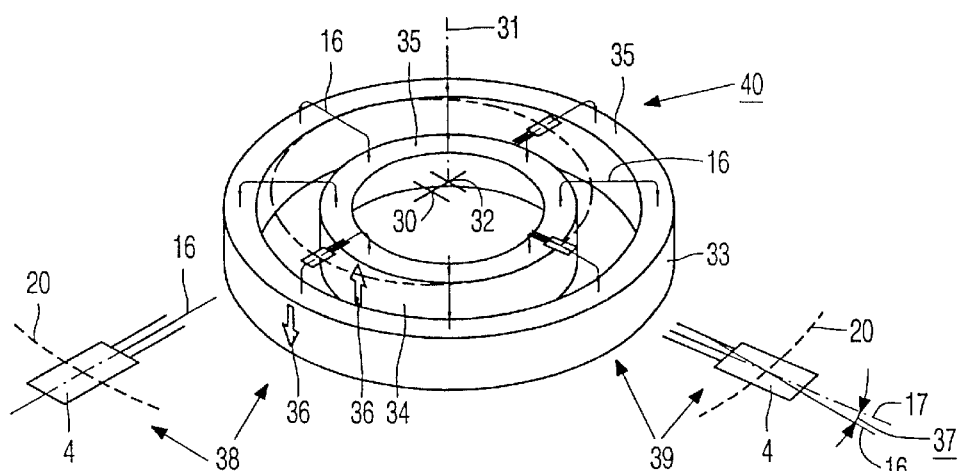
FIG. 5 shows diagrammatically the magnet system of the first embodiment of the magnetoresistive sensor.
Figure 6:
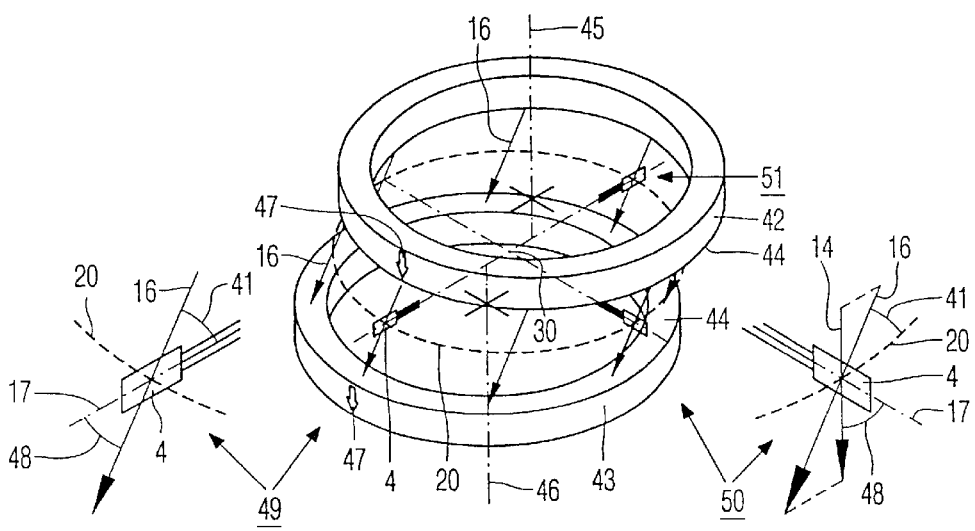
FIG. 6 shows diagrammatically the magnet system of the second embodiment of the magnetoresistive sensor.

In the sensor 1, the magnetoresistive element 4 describes a path 20, 21 with respect to the magnet system 5. In practice, and as shown in FIGS. 1 and 2, the magnetoresistive element 4 will be stationary, whereas the magnet system 5 changes position, but for better understanding of the invention, it will be clearer to describe the relative displacement as a displacement of the magnetoresistive element 4 with respect to the magnet system 5. In FIGS. 4, 5 and 6, the element 4 is shown in a number of positions with respect to the magnetic field for a mutual rotation of the construction parts 2 and 3, and in FIG. 7 for a mutual translation.

Since the magnetoresistive element 4 describes a path 20, 21 with respect to the magnet system 5, the magnet system 5 may be designed in such a way that a desired magnetic field is generated at any point of the path.

FIG. 4 shows an example. Upon displacement of the magnetoresistive element 4 along the path 20, the angle 18 between field lines 16 and the longitudinal axis 17 of the magnetoresistive element 4 changes counterclockwise from, for example, −15° at position 22 via 0° at position 23 to +15° at position 24. A rotation of substantially 360° can be measured in a linear manner with such a sensor.

FIG. 7 shows another example. Upon translation of the magnetoresistive element 4 along the path 21, the angle between the field lines 16 and an axis 19 transverse to the longitudinal axis 17 of the element 4 changes from, for example, −15° at position 25 via 0° at position 26 to +15° at position 27. A translation through a large distance can be measured with such a sensor.

Upon the relative displacement of the construction parts 2 and 3, said component 15 of the magnetic field 14 preferably extends at angles to the magnetoresistive element 4 within a work range in which the magnetoresistive element has a resistance which depends substantially linearly on these angles. The magnet system can then be designed in such a way that large translations and large rotations up to substantially 360° can be measured in a linear manner. In the sensor shown in FIG. 3, the resistance depends on sin 2α. The work range is approximately 30° in this case. The examples shown in FIGS. 4 and 7 comply with this condition. In both cases, the displacement, a rotation in FIG. 4 and a translation in FIG. 7, is measured in a linear manner.

In the first embodiment of the sensor shown in FIGS. 1 and 5 and intended for measuring rotations, the magnetoresistive element 4 describes a circular path 20 with respect to the magnetic field, with a center 30 with respect to which the magnetoresistive element 4 occupies a fixed position; with its connection pins 12 the element always points to the center 30. In this example, the magnet system 5 is secured to the rotating construction part, the shaft 3, and the magnetoresistive element 4 is secured to the fixed construction part 2. This element 4 is arranged next to the centerline 6 of the shaft 3 so that the element 4 and the magnet system automatically describe a circular path 20 with respect to each other.

In the first embodiment of the sensor shown in FIGS. 1 and 5, the magnet system 5 generates a magnetic field 13 with field lines 16 extending radially in the plane of the path 20 with respect to a symmetry axis 31 directed transversely to the plane of the path and intersecting the plane of the path next to the center 30 of the path 20 at the point 32. Dependent on the distance between the center 30 of the path 20 and the point of intersection 32, the angle α varies during the rotation of the construction parts 2 and 3. This distance may be simply chosen to be such that the angle a remains in said work range during the rotation.

When, in this first embodiment, the construction parts 2 and 3 rotate at an angle β with respect to each other, the resistance of the magnetoresistive element does not change linearly with the angle β. The angle a does not linearly depend on the angle β. It appears that the resistance is dependent on the sine of the angle β. This means that rotations up to 180° can be unambiguously measured with this sensor.

The magnet system used in the first embodiment shown in FIGS. 1 and 5 comprises two concentrically arranged ring magnets 33 and 34, with polar faces 35 located in a plane extending parallel to the plane of the path 20 and with a common centerline 31 constituting the axis of symmetry of the magnet system. Both ring magnets 33 and 34 are magnetized in the opposite sense transversely to the plane of the path 20, as denoted by the arrows 36. Such a magnet system, with two ring magnets 33 and 34, may be mounted around the shaft 3, with the centerline 6 of the shaft 3 then passing through the center of the path of the magnetoresistive element. The element 4 and the angle 37 enclosed by the field lines with the longitudinal axis of the element 4 is shown at three positions 38, 39, 40 with respect to this field, while the angle 37 is then consecutively 0°, 15° and 0°. The direction of the component 14 of the magnetic field extending parallel to the surface 9 of the substrate 8 of the magnetoresistive element coincides in this example with that of the field lines 16.

To ensure that the magnetoresistive element 4 in this first embodiment is always magnetized during the mutual rotation of the construction parts 2 and 3, a magnetic field which is as small as possible is sufficient if the surface 9 of the substrate 8 on which the magnetoresistive element 4 is provided is located in the plane of the path 20.

FIGS. 2 and 6 show a second embodiment of the magnetoresistive sensor which is also intended for measuring rotations. Also in this embodiment, the magnetoresistive element 4 describes a circular path 20 with respect to the magnetic field, with a center 30 with respect to which the magnetoresistive element 4 occupies a fixed position, and with its connection pins 12 always pointing to the center 30. The magnet system 5 is secured to the shaft 3 and the magnetoresistive element 4 is secured to the fixed construction part 2.

In the second embodiment, the magnet system 5 generates a magnetic field with substantially parallel field lines 16 intersecting the plane of the path 20 at the location of the circular path 20 at an angle 41. The size of the angle 41 varies during the rotation of the construction parts. The angle 41 may be chosen such that the angle α remains within said work range during the rotation.

Also in this case, it holds that the resistance of the magnetoresistive element substantially changes with the sine of the angle β if the construction parts 2 and 3 rotate at an angle β with respect to each other, so that a rotation of 180° can be unambiguously measured also with this sensor.

The magnet system which is used in the second embodiment shown in FIGS. 2 and 6 comprises two ring magnets 44 and 43 which, with their polar faces 44 facing each other are arranged on both sides and at equal distances from the plane of the path 20, with centerlines 45, 46 intersecting the plane of the path 20 at points 45, 46 located at equal distances on both sides of the center 30 of the path 20, both ring magnets 42 and 43 being magnetized in the same sense, in a direction denoted by arrows 47, transversely to the plane of the path 20. Such a magnet system with two ring magnets 42 and 43 may be mounted around a shaft 3, with the centerline 6 of the shaft 3 then passing through the center 30 of the path of the magnetoresistive element 4. The element 4 and the angle 48 enclosed by the field lines with the longitudinal axis 17 of the element 4 is shown at three positions 49, 50 and 51 with respect to this field, while the angle 37 is consecutively 75°, 90° and 105°. The direction of the component 14 of the magnetic field extending parallel to the surface 9 of the substrate 8 of the magnetoresistive element coincides in this embodiment in the positions 49 and 51 with that of the field lines 16 and does not coincide in the other positions. In the position 50, the field line 16 is perpendicular to the longitudinal axis 17 but does not extend parallel to the surface 7 of the substrate 8. The resistance of the magnetoresistive element 4 is here determined by the component 14 which is directed parallel to this surface 7. As already noted hereinbefore, it is large enough to magnetically saturate the element. The resistance is minimal in the position 50, and the component 14 is perpendicular to the longitudinal axis 17, while the angle α is 45°.

To ensure that the magnetoresistive element 4 in this second embodiment is always saturated during the mutual rotation of the construction parts 2 and 3, a magnetic field which is as small as possible is sufficient if the surface 7 of the substrate 8 on which the magnetoresistive element 4 is provided is transverse to the path 20.

Rotations up to 180° can be unambiguously measured with the sensors 1 described in the first and the second embodiment. The field of application is extended if the sensor comprises two magnetoresistive elements which describe the same circular path with respect to the magnet system, occupy the same fixed position with respect to the center of the path and, viewed from the center, enclose an angle of 90°. This is the case in FIG. 5, for example, at the positions 38 and 39, and in FIG. 6, for example, at the positions 49 and 50. The resistance of one magnetoresistive element then changes upon a mutual rotation of the construction parts by sin β, and the resistance of the second magnetoresistive element which is 90° rotated with respect to the first element, changes by cos β. The angle β can then be calculated from these two resistances over an interval of 360°. By adding a suitable electronic circuit, the rotation through 360° can even be measured linearly.

FIG. 7 shows a third embodiment of the magnetoresistive sensor 1 according to the invention. It is suitable for determining a mutual translation of construction parts. With respect to the magnetic field, the magnetoresistive element 4 describes a rectilinear path 21 which is located in a reference plane 52, with respect to which the magnetoresistive element 4 occupies a fixed position. Either the magnetoresistive element 4 or the magnet system 5 is secured to the moving construction part and then moves along a rectilinear path.

The field lines 16 of the magnetic field enclose different angles 53 along the rectilinear path 21 to the direction 19 transverse to the longitudinal axis 17 of the element 4. The magnet system 5 generates a magnetic field with field lines 16 intersecting the reference plane 52 at the location of the rectilinear path 21 at different angles. These angles may be simply chosen to be such that the angle α remains within said work range during the translation.

Figure 8:
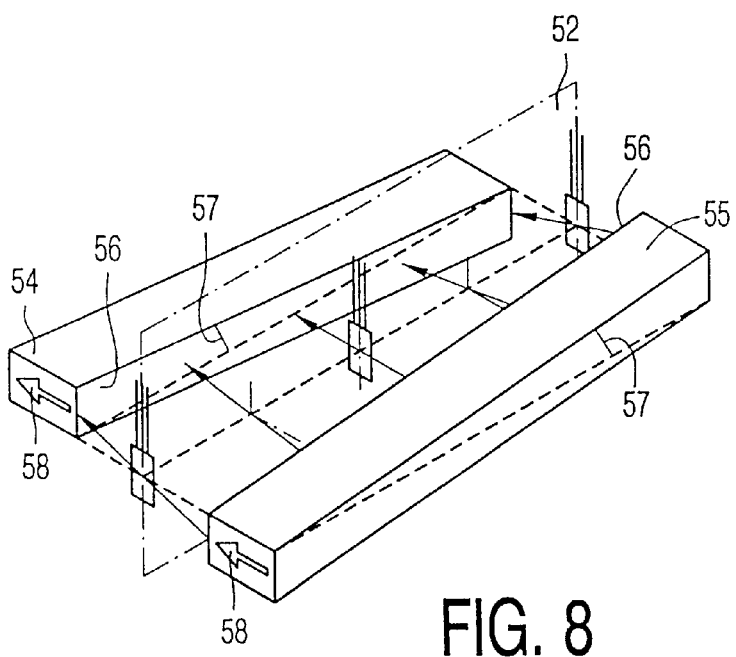
FIG. 8 shows diagrammatically a third embodiment of the sensor for measuring a mutual translation of the construction parts.

In the third embodiment, shown in FIG. 8, a magnet system 5 is used with two elongated magnets 54 and 55 which, with their polar faces 56 facing each other, are arranged on both sides of the reference plane 52 and, viewed in projection on the reference plane 52, intersect each other in the center of the path 21 and enclose an equally large but opposite angle 57 to the rectilinear path 21, both magnets 54 and 55 being magnetized in the same direction transverse to the reference plane 52, as is shown by arrows 58. The two opposite angles 57 may be chosen to be such that the angle α remains within the desired work range.

To ensure that the magnetoresistive element 4 in this third embodiment is always saturated during the mutual translation of the construction parts 2 and 3, a magnetic field which is as small as possible is sufficient if the surface 7 of the substrate 8 on which the magnetoresistive element 4 is provided is transverse to the path 21 of the magnetoresistive element 4.

In this sensor, two magnetoresistive elements may be used which are arranged at substantially the same position rotated 45° with respect to each other. The resistance of one of the elements then depends on sin α and the resistance of the other element depends on cos α. The position can be calculated from the two resistance changes. This determination of the position is substantially independent of the temperature of both elements because changes of the resistance of both elements equally increase or decrease with the temperature.

The invention has been described hereinbefore by way of example with reference to some embodiments. It will be evident that many variations are possible within the scope of the invention. For example, the magnetoresistive element 4 described is an element of the AMR type (anisotropic magnetoresistive element), but other customary magnetoresistive elements, such as those of the GMR type (giant magnetoresistive element) or spin-tunnel-junction elements may also be used to advantage in the sensors described.

Instead of the magnetoresistive element described, comprising one composite strip of magnetoresistive material 9, customary magnetoresistive elements may be used comprising more strips, for example in a bridge circuit. Displacements can be measured with elements of this composition, in which the measurement is substantially independent of the temperature of the sensor. The resistance of the strips in the bridge circuit is temperature-dependent, but the quotient determined in such a bridge circuit is not. Instead of the permanent magnets shown, electromagnets may be used alternatively, and the magnets may be provided with soft-magnetic pole pieces so that a more homogeneous field distribution can be obtained.

What is claimed is:

1. A magnetoresistive sensor for measuring relative displacements of construction parts, comprising: a magnetoresistive element formed on a surface of a substrate, and a magnet system which generates a magnetic field having a component directed parallel to the substrate surface at the area of the magnetoresistive element, which magnetic field component, upon the relative displacement of the construction parts, extends at different angles α to the magnetoresistive element and is so large that the magnetoresistive element is always magnetically saturated during the displacement, characterized in that, upon relative displacement of the construction parts, the magnetoresistive element describes a path with respect to the magnet system, in that, for determining a mutual rotation of the construction parts, the magnetoresistive element describes a circular path with respect to the magnet system, with a center with respect to which the magnetoresistive element occupies a fixed position, and in that the magnet system generates a magnetic field at the location of the path of the magnetoresistive element, which magnetic field has field lines extending radially in the plane of the path with respect to an axis of symmetry directed transversely to the plane of the path and intersecting the plane of the path next to the center of the path.

2. A magnetoresistive sensor as claimed in claim 1, characterized in that, upon the relative displacement of the construction parts, said component of the magnetic field extends at angles α to the magnetoresistive elements, which angles are within a work range in which the magnetoresistive element has a resistance depending substantially linearly on said angles.

3. A magnetoresistive sensor as claimed in claim 1, characterized in that, for determining a mutual translation of the construction parts, the magnetoresistive element describes a rectilinear path with respect to the magnet system, which path is located in a reference plane with respect to which the magnetoresistive element occupies a fixed position.

4. A magnetoresistive sensor as claimed in claim 1, characterized in that the magnet system comprises two concentrically arranged ring magnets with their polar faces located in a plane extending parallel to the plane of the path, and with a common centerline constituting the axis of symmetry of the magnet system, said two ring magnets being magnetized in the opposite sense transversely to the plane of the path.

5. A magnetoresistive sensor as claimed in claim 1, characterized in that the substrate surface on which the magnetoresistive element is formed is located in the plane of the path of the magnetoresistive element during the rotation.

6. A magnetoresistive sensor as claimed in claim 1, characterized in that the magnet system generates a magnetic field at the location of the path of the magnetoresistive element, which magnetic field has field lines extending substantially parallel to each other and intersecting the plane of the path at an angle at the location of the circular path.

7. A magnetoresistive sensor as claimed in claim 6, characterized in that the magnet system comprises two ring magnets which, with their polar faces facing each other, are arranged on both sides and at an equal distance from the plane of the path, with centerlines intersecting the plane of the path at points located at equal distances on both sides of the center of the path, said two ring magnets being magnetized in equal sense transversely to the plane of the path.

8. A magnetoresistive sensor as claimed in claim 6, characterized in that the substrate surface, on which the magnetoresistive element is formed, is located transverse to the path of the magnetoresistive element during the rotation.

9. A magnetoresistive sensor as claimed in claim 1, characterized in that the sensor comprises two magnetoresistive elements which describe the same circular path with respect to the magnet system, occupy the same fixed position with respect to the center of the path and, viewed from the center, enclose an angle of 90°.

10. A magnetoresistive sensor as claimed in claim 3, characterized in that the magnet system generates a magnetic field with field lines intersecting the reference plane at different angles at the location of the rectilinear path.

11. A magnetoresistive sensor as claimed in claim 10, characterized in that the magnet system comprises two elongated magnets which, with their polar faces facing each other, are arranged on both sides of the reference plane and, viewed in projection on the reference plane, intersect each other in the center of the path and enclose an equally large, but opposite angle to the rectilinear path, said two magnets being magnetized in the same direction transverse to the reference plane.

12. A magnetoresistive sensor as claimed in claim 10, characterized in that the substrate surface, on which the magnetoresistive element is formed, is located transverse to the path of the magnetoresistive element during the translation.

13. A magnetoresistive sensor as claimed in claim 1 wherein the magnet system comprises first and second concentric ring magnets magnetized in the opposite sense and transverse to a plane of the path.

14. A magnetoresistive sensor as claimed in claim 13 wherein the first and second ring magnets have polar faces located in a plane extending parallel to a plane of the path, and with a common center line constituting an axis of symmetry of the magnet system.

15. A magnetoresistive sensor as claimed in claim 3 wherein the magnet system comprises two elongated magnets arranged on opposite sides of the reference plane and magnetized in the same direction transverse to the reference plane.

16. A magnetoresistive sensor as claimed in claim 15 wherein the two magnets have polar faces facing each other and the substrate surface is located transverse to the path of the magnetoresistive element during the translation.

17. A magnetoresistive sensor as claimed in claim 2 wherein, for determining a mutual rotation of the construction parts, the magnetoresistive element describes a circular path with respect to the magnet system, with a center with respect to which the magnetoresistive element occupies a fixed position.

18. A magnetoresistive sensor as claimed in claim 1 wherein the magnetoresistive element describes a circular path with respect to the magnet system, and the magnet system generates a magnetic field at the location of the path of the magnetoresistive element, said magnetic field having field lines extending radially in the plane of the path with respect to an axis of symmetry directed transverse to the plane of the path and intersecting the plane of the path close to the center of the path.

19. A magnetoresistive sensor as claimed in claim 1 wherein the path lies in a plane, and the magnet system comprises two ring magnets arranged on opposite sides and at an equal distance from the plane of the path, said two ring magnets being magnetized in the same sense transverse to the plane of the path.

20. A magnetoresistive sensor as claimed in claim 19 wherein the substrate surface is positioned transverse to the path of the magnetoresistive element.

21. A magnetoresistive sensor as claimed in claim 1 wherein the substrate surface is positioned transverse to the path of the magnetoresistive element.

22. A magnetoresistive sensor as claimed in claim 1 wherein the path lies in a plane, and the magnet system comprises two non-concentric ring magnets located in parallel planes on opposite sides and equal distances from the plane of the path, said two ring magnets being magnetized in the same sense transverse to the plane of the path.

* * * * *